(12) United States Patent
Bollay et al.

(10) Patent No.: US 7,046,666 B1
(45) Date of Patent: May 16, 2006

(54) METHOD AND APPARATUS FOR COMMUNICATING BETWEEN DIVERGENT NETWORKS USING MEDIA ACCESS CONTROL COMMUNICATIONS

(75) Inventors: Benn Bollay, San Francisco, CA (US); David B. Donahue, Mountain View, CA (US); Vinai Kolli, Fremont, CA (US); Thomas Obenhuber, San Francisco, CA (US)

(73) Assignee: The DirecTV Group, Inc., El Segundo, CA (US)

( * ) Notice: Subject to any disclaimer, the term of this patent is extended or adjusted under 35 U.S.C. 154(b) by 963 days.

(21) Appl. No.: 10/006,364

(22) Filed: Dec. 6, 2001

(51) Int. Cl.
*H04L 12/28* (2006.01)
(52) U.S. Cl. ...................... 370/392; 370/401
(58) Field of Classification Search ............... None
See application file for complete search history.

(56) References Cited

U.S. PATENT DOCUMENTS

| 5,420,862 | A | * | 5/1995 | Perlman | ............... | 370/401 |
| 5,491,694 | A | | 2/1996 | Oliver et al. | ............... | 370/85.4 |
| 5,751,971 | A | | 5/1998 | Dobbins et al. | ....... | 395/200.68 |
| 5,790,541 | A | | 8/1998 | Patrick et al. | ............... | 370/392 |
| 5,790,546 | A | | 8/1998 | Dobbins et al. | ............ | 370/400 |
| 6,115,385 | A | | 9/2000 | Vig | ............... | 370/401 |

OTHER PUBLICATIONS

Plummer, David C., RFC 826: An Ethernet Address Resolution Protocol, Nov. 1982.*
Postel, J., RFC 925: Multi-LAN Address Resolution, Oct. 1984.*

* cited by examiner

*Primary Examiner*—Chi Pham
*Assistant Examiner*—Jordan Hamann
(74) *Attorney, Agent, or Firm*—Georgann S. Grunebach

(57) ABSTRACT

A method for communicating across divergent network segments in a network. The network has a first network segment and a second network segment. The first network segment includes a switch that is controlled by a module that has instructions encoding a method. In the method, an ARP request packet is received from a first device. The ARP request packet includes a request to locate a second device. The first device is coupled to the first network segment and the second device is coupled to the second network segment. The ARP request packet is broadcast to the network segments outside of the first network segment and, as a result, a reply from the second network segment is received. The reply is transmitted to the first device, such that in use, ARP tables are modified on the first device and the second device so that future communication between said first device and said second device is enabled using a layer two communication protocol without any requirement for a layer three communication protocol.

15 Claims, 4 Drawing Sheets

| Network Number | Host Number |

Class B address

| 11111111111111111111111 | 00000000 |

Subnet mask (255.255.255.0)

| Network Number | Subnet ID | Host ID |

Subnetted address (Prior Art)

Fig. 1

| Layer | Functionality |
|---|---|
| 7 | Application |
| 6 | Presentation |
| 5 | Session |
| 4 | Transport |
| 3 | Network |
| 2 | Data Link |
| 1 | Physical |

(Prior Art)

Fig. 2

METHOD AND APPARATUS FOR COMMUNICATING BETWEEN DIVERGENT NETWORKS USING MEDIA ACCESS CONTROL COMMUNICATIONS

TECHNICAL FIELD

The present invention relates generally to a method of facilitating media access control (MAC) communication between devices across different physical elements of a network so that devices can be moved to any interface in the network without changing the interface.

BACKGROUND OF THE INVENTION

The practice of subnetting provides a simple way to reduce the total number of network numbers that are assigned. The idea is to take a single IP network number and allocate the IP addresses associated with that network number to several physical networks, which are now referred to as subnets. From outside a network of subnets, all that is needed to reach any subnet in the network, is knowledge of where the network of subnets connects to the rest of the Internet. This is often a single point, so a single entry in a switch table will suffice to forward data to any device in the network.

The mechanism by which a single network number can be shared among multiple networks involves configuring all the nodes on each subnet with a subnet mask. With simple IP addresses, all hosts (i.e. devices) on the same network must have the same network number. The subnet mask enables one to introduce a subnet number. All hosts on the same physical network have the same subnet number, which means that hosts on different physical networks (i.e. subnets) may share a single network number.

The subnet mask effectively introduces another level of hierarchy into the IP address. For example, consider the case in which a single class B address is to be shared among several physical networks. A class B address has a mask of 255.255.0.0. If the mask 255.255.255.0 is used for the single class B address, the top 24 bits (where the mask has 1 s) is now defined to be the network number, and the lower 8 bits (where the mask has 0 s) is the host number. Since the top 16 bits identify the network in a class B address, the single class B address that is shared among several physical networks may now be viewed as having not two parts but three: a network part (top 16 bits), a subnet part (next 8 bits), and a host part (last 8 bits). This structure is shown in FIG. 1.

What subnetting means to a host is that it is now configured with both an IP address and a subnet mask for the subnet to which it is attached. For example, consider a host H1 in a subnet that is configured with an address of 128.96.34.15 and a subnet mask of 255.255.255.128. All hosts on the same subnet are configured with the same mask. That is, there is exactly one subnet mask per subnet. The bitwise AND of these two numbers defines the subnet number of the host and of all other hosts on the same subnet. In this case, 129.96.34.15 AND 255.255.255.128 equals 128.96.34.0, so this is the subnet number for the topmost subnet.

When the host wants to send a packet to a certain IP address, the first thing it does is to perform a bitwise AND between its own subnet mask and the destination IP address. If the result equals the subnet number of the sending host, then it knows that the destination host is on the same subnet and the packet can be delivered directly over the subnet. If the results are not equal, the packet needs to be sent to a router to be forwarded to another subnet. Consider H1, having the address 128.96.34.15 and the subnet mask 255.255.255.128, and H2 having the address 128.96.34.139. If H1 is sending to H2, then H1 ANDs its subnet mask (255.255.255.128) with the address for H2 (129.96.34.139) to obtain 128.96.34.128. This does not match the subnet number for H1 (128.96.34.0) so H1 knows that H2 is on a different subnet. Since H1 cannot deliver the packet to H2 directly over the subnet, it sends the packet to its default switch instead. More information on networks is available from numerous references, such as Peterson and Davie, *Computer Networks, A Systems Approach*, Morgan Kaufmann Publishers, Inc., 1996.

In a normal network topology, routes are used to direct traffic for particular networks to particular interfaces. As used herein, the term interface refers to a network segment. For example, the current routing topology for an unconfigured gateway may have the form shown in Table 1.

TABLE 1

| Routing table for an unconfigured gateway | | | |
|---|---|---|---|
| Network | Mask | Gateway | Interface |
| 0.0.0.0 | 000.000.000.000 | 10.9.1.2 | dsl0 |
| 10.6.1.0 | 255.255.255.000 | 10.6.1.2 | eth0 |
| 10.7.1.0 | 255.255.255.000 | 10.7.1.2 | eopp0 |
| 10.8.1.0 | 255.255.255.000 | 10.8.1.2 | usb0 |

This routing table sets up three distinct subnets, that of 10.6.1.*, 10.7.1.*, and 10.8.1.*, each connected through a particular physical interface (ds10, eth0, eopp0, sub0) which has a gateway address within that particular subnet. For example, eth0 has the gateway address of 10.6.1.2, which is numerically part of the 10.6.1.* network.

The three routes defined in the routing table described in Table 1 are considered "network routes" because the bitwise mask is not all ones. The operation to determine a route for an IP address uses the mask and the network to determine which route to follow. For example, if we have a packet with the IP address 10.7.1.4 and are trying to determine which gateway to send the packets, the routing process would look like this:

1 For each route in routing Table 1:
2 if (network AND mask)=(targetIP AND mask) then {
3 send the packet to that gateway and leave the loop }

Using this algorithm, packets with the IP address of 10.7.1.4 will be sent to the eopp0 interface with the gateway IP address of 10.7.1.2. Table 1 could represent an unconfigured routing table found in a modern home computer network connected to the Internet by a DSL.

One disadvantage of the myriad of different methodologies used to interconnect devices in a network is apparent when changes to a subnet are made. When a user moves a device, such as a computer, from one interface to another interface within a network, the user must call customer support. This call is necessary because each device is associated with a particular interface in prior art systems. Thus, the system administrator must manually reassign the device from the old interface to the new interface.

A number of approaches have been taken to improve the flow of data across a network. In one known approach Oliver et al. (U.S. Pat. No. 5,491,694) formats data using a specialized format termed the Canonical Frame Format and routes data using a "virtual connection" technique. However, the drawback of Oliver et al. is that it requires the use of specialized data formats, it requires the creation of specialized look-up tables, and altogether fails to address the problem of providing a method and apparatus for moving a device from one subnet to another subnet without the need to call customer support to change the interface.

In another approach Dobbins et al. (U.S. Pat. No. 5,751, 971 and U.S. Pat. No. 5,790,546) disclose an apparatus and method wherein multiple router interfaces are assigned the same IP network address, creating an IP work group. This apparatus allows a host to be relocated anywhere in the work group without requiring reconfiguration of the host. Furthermore, Dobbins et al. discloses a technique for using an Address Resolution Protocol (ARP) request so that a host on one interface (first host) may locate a host on another interface (second host). The drawback with Dobbins et al. is that Dobbins requires packets to completely traverse the IP stack twice (once up, once down) before they are routed out the correct interface. This provides a burden on LAN cross-segment traffic. Furthermore, the techniques of Dobbins et al. age out, causing deferral of IP packets in caches, as well as a repeated need to send out broadcast ARP requests in order to determine the IP address of the second host.

In the approach of Patrick et al. (U.S. Pat. No. 5,790,541), an intermediate network packet architecture is implemented in order to conserve valuable IP addresses. The approach of Patrick et al. minimizes the need for IP numbers. However, Patrick et al. does not address the above-identified needs found in the art, including the need to provide a method and apparatus that allows for a device to be moved from one subnet to another subnet without the need to make a customer service call in order to manually reconfigure the network so that the device is recognized on the new subnet.

Vig et al. (U.S. Pat. No. 6,115,385) disclose a method of creating a large flat IP network by adjusting subnet masks of hosts such that these hosts can communicate directly with other hosts without the use of an intermediate router. However, the invention is based on the idea that subnets can be implemented in layer-2 LAN switches. Although this principle is useful within the context provided by Vig et al., it does not address the above-identified problems found in prior art networking systems.

Given the above background, what is needed in the art is a method to facilitate communication between devices in networks and subnetworks in a seamless manner so that devices may be moved from one location in a network to another location in the network without the numerous configuration problems found in prior art systems.

SUMMARY OF THE INVENTION

The present invention provides a method for facilitating communication between devices in networks and subnetworks in a seamless manner. In the invention, a middleware layer is provided. The middleware layer, also known as a virtual port, serves as an interface that all networking programs may use. The virtual port translates from the general method used to transfer packets, to the specific method that each of the physical devices uses. The virtual port allows devices across divergent physical interfaces to communicate seamlessly at both layer 2 and layer 3 of the International Organization for Standardization Reference Model of Open System Interconnection (ISO OSI Model). The virtual port additionally provides for multiple internet address pools on the same LAN. Functionally, the user has expanded range of customizability for his network. By implementing the virtual port of the present invention, the user is able to move his computer to any interface he wishes without the need to call customer support to change the interface.

In conventional network topologies, each interface is allocated a different subnet at the level of the network layer in the ISO OSI Model. In the present invention, the need for allocation of a subnet to each interface is removed using a novel host specific routing scheme. Then, the host specific routing scheme is used to create an Address Resolution Protocol (ARP) map that is wired in at the data link level of the ISO OSI Model. The ARP map is used to mediate ARP requests from a host on one segment of a network to a host on another segment of the network. The ARP map assigns special media access control (MAC) addresses. Finally a MAC switch directs inter-segment traffic to the appropriate segment of the network using the special MAC addresses assigned by the ARP map. In this way, devices on divergent physical interfaces may communicate seamlessly with each other.

One embodiment of the present invention provides a method for communicating across divergent network segments in a network. In the method, a request from a first device to locate a second device is received. The first device is coupled to a first network segment and the second device is coupled to a second network segment in the network. The request is broadcast to network segments outside of the first network segment. Then, a reply is acquired from the second network segment. The reply is transmitted to the first device, such that in use, Address Resolution Protocol (ARP) tables are modified on the first device and the second device so that future communication between the first device and the second device is enabled.

In some embodiments, the receiving step comprises receiving an ARP request from the first device. This ARP request includes a first MAC address associated with the first device, a first IP address associated with the first device, and a second IP address associated with a second device. In one embodiment, the broadcast step is, in fact, effectuated using a method. In this method, the first MAC address is converted to a first specialized multicast MAC address. Then, the ARP request is modified to a multicast ARP request containing the first specialized multicast MAC address as well as the first and second IP addresses. Finally, the multicast ARP request is sent to all network segments outside of the first network segment.

In yet other embodiments of the present invention, the acquiring step further comprises accepting an ARP reply from the second network segment. The ARP reply originates from the second device. The ARP reply includes, as a source address, a second specialized multicast MAC address that represents the second device. The ARP reply also includes the first specialized multicast MAC address as well as the first and second IP addresses. In one embodiment, a switch on the second network subnet preprocesses the ARP reply before sending the packet to the first subnet. In this preprocessing step, the ARP reply is converted by a switch in the second network segment so that the ARP reply packet source indicator is changed from the MAC address of the second device to the second specialized multicast MAC address.

In some embodiments of the present invention, the advantages of the invention are facilitated by adding a first ARP table entry to the ARP table of the first device, the first ARP table entry associates the second IP address with the second specialized multicast MAC address. Further, a second ARP table entry is added to the ARP table of the second device.

The second ARP table entry associates the first IP address with the first specialized multicast MAC address. Further, some embodiments of the present invention utilize a MAC switch and the first and second ARP table entries to forward data packets addressed to the first and second specialized multicast MAC addresses. The MAC switch converts packets addressed to the first specialized MAC address so that they are addressed to the MAC address of the first device. Also, the MAC switch converts packets addressed to the second specialized MAC address so that they are destined to the MAC address of the second device.

BRIEF DESCRIPTION OF THE DRAWINGS

For a better understanding of the nature and objects of the invention, reference should be made to the following detailed description taken in conjunction with the accompanying drawings, in which:

FIG. 1 illustrates an IP address that includes both a network mask and a subnet mask in accordance with the prior art.

FIG. 2 illustrates the International Organization for Standardization Reference Model of Open System Interconnection (ISO OSI Model) in accordance with the prior art.

Like reference numerals refer to corresponding parts throughout the several views of the drawings.

Figure 3:
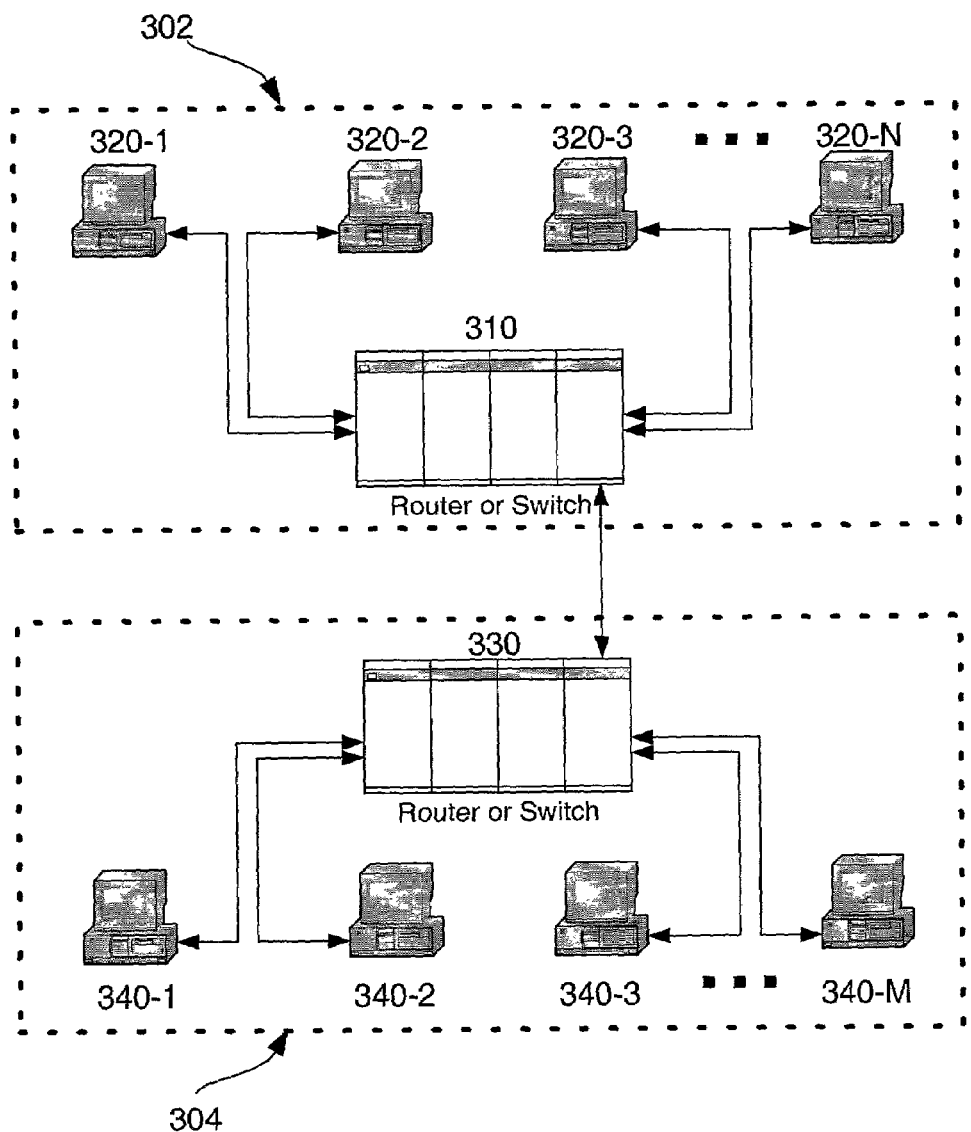
FIG. 3 illustrates a network that includes network segment 302 and network segment 304, in accordance with one embodiment of the present invention.

DETAILED DESCRIPTION OF THE
PREFERRED EMBODIMENTS

The present invention solves the problems found in the prior art by providing a middleware layer, called a virtual port, that serves as an interface that all networking programs may use. The virtual port translates from the general method used to transfer packets, to the specific method that each of the physical devices uses. The virtual port provides for a non-uniform network topology that may be used in a network such as a home network, office network, or university network. The virtual port allows devices across divergent physical interfaces to communicate seamlessly. The virtual port additionally provides for multiple internet address pools on the same LAN. Using a form of address resolution proxy, the virtual port keeps all hosts informed about other hosts on the system while not requiring any interface to be in promiscuous mode or contribute severely to the overall load on the routing device.

Functionally, the user has expanded range of customizability for his network. By implementing the virtual port of the present invention, the user is able to move his computer to any interface he wishes without the need to call customer support to change the interface. An additional advantage of the present invention is that it provides network address translation (NAT) functionality. Thus, the user is able to support multiple computers communicating seamlessly with each other across different physical segments. Yet another advantage of the present invention is that network provider customer service will no longer have to field calls for customers changing from one interface to another.

FIG. 2 illustrates the International Organization for Standardization Reference Model of Open System Interconnection (ISO OSI Model). In the ISO OSI model, the data link layer provides error-free transmission facilities to the network layer. Examples of data link layer protocols include High Level Data Link Control (HDLC), Ethernet, and Carrier Sense Multiple Access/Collision Detect (CSMA/CD). The network layer defines basic unit of transfer across network, such as Internet Protocol packets.

In conventional network topologies, each physical interface is allocated a different subnet at the level of the network layer in the ISO OSI Model. In the present invention, the need for allocation of a subnet to each physical interface is removed using a novel host specific routing scheme. Then, the host specific routing scheme is used to create an Address Resolution Protocol (ARP) map that is wired in at the data link level of the ISO OSI Model. The ARP map is used to mediate ARP requests from a host on one segment of a network to a host on another segment of the network. The ARP map assigns special media access control (MAC) addresses. Finally a MAC switch directs inter-segment traffic to the appropriate segment of the network using the special MAC addresses assigned by the ARP map. In this way, devices on divergent physical interfaces may communicate seamlessly with each other.

Host Specific Routing

In the present invention, distinct subnets are eliminated completely to utilize a single subnet. Thus, the routing Table of Table 1 is transformed to look like the routing table of Table 2.

TABLE 2

Routing table with subnets eliminated

| Network | Mask | Gateway | Interface |
| --- | --- | --- | --- |
| 0.0.0.0 | 000.000.000.000 | 10.9.1.2 | dsl0 |
| 10.10.1.1 | 255.255.255.255 | 10.10.1.1 | eth0 |
| 10.10.1.2 | 255.255.255.255 | 10.10.1.2 | eopp0 |
| 10.10.1.3 | 255.255.255.255 | 10.10.1.3 | usb0 |

Because each mask is all ones, only packets directed at that particular host are routed there. For example, only packet directed at the target IP address of say, 10.10.1.5 will be routed through gateway 10.10.1.1. These kind of routes are called 'host routes.' It is appreciated that IP addresses may be categorized into two different forms, non-routeable IP addresses and routeable IP addresses. Non-routeable IP addresses are reserved for private networks. See http://www.iana.org/assignments/ipv4-address-space. Nonrouteable IP addresses include those IP addresses that, for example, have the form 10.xxx.xxx.xxx or 192.168.xxx.xxx. Non-routeable IP addresses will not be routed on the internet at large. Therefore, non-routeable IP addresses are beneficial because they provide an address space that facilitates intranetwork communication. It is noted that Table 2 utilizes non-routeable IP addresses.

Utilizing routing Table 2 as a baseline, packets for host PCs are routed by creating host routes for that PC using the interface in question as the gateway. For example, if a PC is connected to the Ethernet and has the IP address 10.10.1.5, the route table would look like Table 3.

TABLE 3

Routing table using host specific routes

| Network | Mask | Gateway | Interface |
|---------|------|---------|-----------|
| 0.0.0.0 | 000.000.000.000 | 10.9.1.2 | dsl0 |
| 10.10.1.5 | 255.255.255.255 | 10.10.1.1 | eth0 |
| 10.10.1.1 | 255.255.255.255 | 10.10.1.1 | eth0 |
| 10.10.1.2 | 255.255.255.255 | 10.10.1.2 | eopp0 |
| 10.10.1.3 | 255.255.255.255 | 10.10.1.3 | usb0 |

Because the host route 10.10.1.5 uses the eth0 device's IP address 10.10.1.1 as a gateway, packets from 10.10.1.5 will be properly routed through the eth0 interface. Thus, the packets will be directed to the correct interface by the route table without any additional costs. This functionality is called host specific routing. If an additional computer, having the IP address 10.10.1.6, is added to the route table of Table 3, it would have the form:

TABLE 4

Addition of another computer to the routing table of Table 3

| Network | Mask | Gateway | Interface |
|---------|------|---------|-----------|
| 0.0.0.0 | 000.000.000.000 | 10.9.1.2 | dsl0 |
| 10.10.1.5 | 255.255.255.255 | 10.10.1.1 | eth0 |
| 10.10.1.6 | 255.255.255.255 | 10.10.1.1 | etho |
| 10.10.1.1 | 255.255.255.255 | 10.10.1.1 | eth0 |
| 10.10.1.2 | 255.255.255.255 | 10.10.1.2 | eopp0 |
| 10.10.1.3 | 255.255.255.255 | 10.10.1.3 | usb0 |

Thus, as illustrated in Tables 3 and 4, host specific routing using a non-routeable address pool, such as 10.xxx.xxx.xxx, is performed by assigning a unique nonrouteable IP address to each physical interface. Then, each computer having a non-routeable IP address uses the appropriate IP address for the physical interface. In this way, packets are routed through the correct interface.

The scheme illustrated in Tables 3 and 4, in which each interface is given a unique non-routeable IP address, works fine for the non-routeable address pool. Non-routable addresses are inexpensive and each interface can afford to have a unique one. Routeable IP addresses are more problematic. When a device acquires an IP address, the IP address has to be in the same subnet as it's assigned address. For example, the non-routeable PC in the network topology outlined in Table 4 having the network address of 10.10.1.5 would be assigned to a subnet of 255.255.255.0 by a system using the Dynamic Host Configuration Protocol (DHCP). Therefore, the PC in Table 5 having the network address of 10.10.1.5 would believe that all addresses on the 10.10.1.* network were on the same physical layer that it is on. So, a host that has been assigned a routeable address requires a routeable address to be it's gateway. This is problematic because routeable addresses are expensive, and in a typical network environment, it would be too costly to assign a unique routeable address to each interface.

To solve the problem of the cost of routeable addresses, the present invention adds a routeable alias for the same address to each interface. An alias is an additional address to which the interface will respond. Thus, each interface has a unique non-routeable address and a shared routeable address.

To illustrate the use of an alias, consider the example in which there is a PC located on the usb0 interface and the routeable address subnet is 210.10.2.0 with a mask of 255.255.255.252. Thus, the binary representation of the mask is:

11111111.11111111.11111111.11111100

The Internet Standard Subnetting Procedure, RFC 950 (http://info.internet.isi.edu:80/in-notes/rfc/files/rfc950.txt) states that a host mask of all zeros or all ones cannot be used as a valid IP addresses. That is, the Host IP address and the network mask must not be equal to 0 or to all ones. Thus, the 255.255.255.252 mask allows for a subnet that has a network address, two host (usable addresses), and a multicast address. Thus, if a device is located on the usb0 interface and the routeable address subnet is 210.10.2.0 with a mask of 255.255.255.252, then 210.10.2.0 is the network address, 210.10.2 and 210.10.1 are the usable addresses, and 210.10.2.3 is the broadcast address.

This is so, because the 255.255.255.252 mask has the binary representation:

11111111.11111111.11111111.111100 and thus allows for a subnet in which 0 (00) is the network address, 1 (01) and 2 (10) are usable addresses, and 3 (11) is the broadcast address. Using the methods of the present invention, the gateway interfaces would share the address of 210.10.2.2 and the new device would be assigned the address of 210.10.2.1. Thus, the route table would look like that of Table 5.

TABLE 5

Addition of another computer to the routing table of Table 3

| Network | Mask | Gateway | Interface |
|---------|------|---------|-----------|
| 0.0.0.0 | 000.000.000.000 | 10.9.1.2 | dsl0 |
| 210.10.2.1 | 255.255.255.255 | 10.10.1.2 | usb0 |
| 10.10.1.1 | 255.255.255.255 | 10.10.1.1 | eth0 |
| 10.10.1.2 | 255.255.255.255 | 10.10.1.2 | usb0 |
| 10.10.1.3 | 255.255.255.255 | 10.10.1.3 | eopp |

Because the USB0 interface has both the address of 10.10.1.2 and 210.10.2.2, it can act both as a gateway for the PC and as a route gateway for packets coming from the Internet. If the consumer had a larger subnet, then simply more host routes would be added.

Host specific routing requires that host specific routes be added for each host. There are several ways in which this can be done. For example, in many networks, the Dynamic Host Configuration Protocol (DHCP) is used as a central arbitrator for IP addresses. The DHCP depends upon the TPC/IP network to forward DCHP requests from devices which do not yet have an IP address to servers that can lease a valid IP address. Conventional DHCP begins with DCHP discovery in which the device that does not have an IP addresss finds out the identity of a DHCP server by sending a DHCPDISCOVER message to the network.

When a DHCP server receives a DHCPDISCOVER message it will reply with what is called an "offer." The DHCPOFFER contains an IP address for the requesting device to use. When the DHCPOFFER arrives at the device there is a second step to the DHCP process that must be completed. The device must turn around and make an actual request of the DHCP server to use the address that was contained in the offer using a DHCPREQUEST. If the server is unable to satisfy the DHCPREQUEST message (e.g., the requested network address has been allocated), the server generally responds with a DHCPNAK message and the configuration process is restarted. However, if the server is able to satisfy the DHCPREQUEST message, it sends a DHCPACK message to the device with configuration parameters including how long the device may use the IP address. Generally, the device then performs a final check on the IP address (e.g., ARP for allocated network address), and notes the duration of the lease specified in the DHCPACK message. At this point, the device is configured with a valid IP address. If the device detects that the IP address is already in use (e.g., through the use of ARP), the device sends a DHCPDECLINE message to the server and restarts the configuration process.

It is possible to hook into the final steps of the DHCP process described above to add in a host route. Specifically, when the DHCP responds with a DHCPACK, the server then records the IP address and the interface in the flash filesystem to persist it across reboot. At the same time, the DHCP process adds in the host route.

Another method for facilitating host specific routing is to use gratuitous ARP. On Ethernet-based networks, IP hosts cannot talk to each other directly by using their IP addresses. IP addresses have no special meaning in terms of Ethernet addressing. IP addresses have to be mapped into MAC (Ethernet) addresses so that IP packets can be forwarded to the correct destination. The mechanism by which hosts determine the mapping between IP addresses and MAC addresses is called ARP (Address Resolution Protocol).

ARP depends on a capability of Ethernet called "broadcasting." In effect, a host that wants to communicate using the IP protocol with another IP host on the same Ethernet broadcasts a message saying "who is X?" where X is the IP address to which it wishes to send a message.

To understand what follows, it must be appreciated that four pieces of information are required for communication on an Ethernet network using IP: two IP addresses and two MAC addresses. The sending IP host knows three of these, its own IP and MAC addresses and the IP address of the receiving host. What it needs to learn is the MAC address of the receiving host. So, it bundles up what it knows and sends a message on the Ethernet as a broadcast looking for the answer to its question.

Every host on an Ethernet network is obliged to receive and process every broadcast message that is sent. Most of the receivers will look quickly at this particular message, determine that it is an ARP request, check to see what IP address is being sought and decide that they are not the one being requested. But typically, one system will examine the packet and decide that it is "the one." In that case, it fills in the missing information (its MAC address) and sends the packet back to the sender. Now the original sender knows the answer and can communicate (over the Ethernet) with the IP host it was seeking.

This information is stored away in a table known as the "ARP cache" and is used on a continuing basis to send IP messages using Ethernet (MAC) addresses. The entries in the ARP cache "time out" if they go unused for a period of time (in case the MAC address of a system should change as would happen if a broken Ethernet adapter had to be replaced). All IP hosts maintain their own personal ARP cache.

It is the habit of most, if not all, operating systems to send out a gratuitous ARP when they boot. A gratuitous ARP is an ARP that is sent out asking for the MAC address of the host that has the same IP as the PC sending out the ARP. This allows the PC to detect if any other host is currently using it's IP address without waiting for an actual conflict to occur. Thus, as each system comes up, the gratuitous ARP can be used as an event to create a host route.

ARP Mapping

The present invention has several different network segments that a host must be able to communicate between. Therefore, what is needed is a way to extract out the packets from each of the different network segments that are in fact destined for hosts on other network segments and to correctly route those packets. This problem is illustrated in FIG. 3. FIG. 3 illustrates a network that includes network segment 302 and network segment 304. Network segment 302 comprises devices 320-1 through 320-N as well as switch 310. Network segment 304 comprises devices 340-1 through 340-N as well as switch 330.

Each frame transmitted in an Ethernet network (also referred to as a network segment), such as 302 or 304 (FIG. 3), includes two MAC addresses. The first MAC address identifies the source device and the second MAC address identifies the destination of the frame. Each device 320 and 340 in FIG. 3 has a computer network interface card. Each computer network interface card is allocated a globally unique six byte address when the factory manufactures the card. This six byte address is stored in a PROM on the network address card. This is the normal source address used by an interface. A device sends all packets that it creates with its own hardware source address, and receives all packets that match its hardware address or a special broadcast address. Therefore, it is possible for devices 320 to communicate with each other using Media Access Control (MAC) addresses because they are in the same network segment (302). Likewise, devices 340 can communicate with each other using MAC addresses because they are in the same segment (304).

The problem arises when a device 320 wishes to communicate with a device 340 (FIG. 2). Devices 320 and 340 are not on the same physical link. Layer 2 protocols such as ARP are not normally routed by layer 3 routers. Therefore, ARP replys from hosts not on the same physical link generally are not received by a device. However, communication between devices on different physical links is desirable for any of a number of reasons. For example, a device 320 could be a PC and a device 340 could be a printer. Communication between the PC and the printer would be needed for the PC to send print jobs to the printer.

One way to accomplish the task of facilitating communication between devices that are on different physical networks is through a novel use of the Address Resolution Protocol (ARP). As discussed above, ARP is a protocol used by Internet Protocol (IP) in network layer (FIG. 2; layer 3) to map IP network addresses to hardware addresses used by a data link protocol. ARP operates below the network layer as a part of the data link layer (FIG. 2; layer 2) and is used to support IP over the Ethernet.

The goal of ARP is to enable each device, such as devices 320 or 340 (FIG. 3) on a network to build up a table of mappings between IP addresses and link-level addresses. Since these mappings may change over time (e.g., because a printer is moved from one subnet to another subnet), the entries are timed out periodically and removed. In some ARP systems, this happens on the order of every 15 minutes. The set of mappings currently stored in a host is known as the ARP cache or ARP table.

The term address resolution refers to the process of finding an address of a computer in a network. Using FIG. 3 as a reference, the address is "resolved" using a protocol in which a piece of information is sent by a device process executing on a device 320 or 340 to a server process executing on the switch for the network segment to which the device is a member. The information received by the switch allows the switch to uniquely identify the network system for which the address was required and therefore to provide the required address. The address resolution procedure is completed when the device receives a response from the switch containing the required address.

The Ethernet address is a link layer address and is dependent on the interface card which is used. IP operates at the network layer (FIG. 2; layer 3) and is not concerned with the network addresses of individual nodes which are to be used. ARP is therefore used to translate between the two types of address. The ARP client and switch processes operate on all computers using IP over Ethernet. The processes are normally implemented as part of the software driver that drives the network interface card.

To reduce the number of address resolution requests, a device 320 or 340 (FIG. 3) normally caches resolved addresses for a short period of time. The ARP cache is of a finite size, and would become full of incomplete and obsolete entries for computers that are not in use if it was allowed to grow without check. Therefore, entries in the ARP cache periodically time out. This deletes unused entries and frees space in the cache. It also removes any unsuccessful attempts to contact computers that are not currently running.

ARP takes advantage of the fact that Ethernet supports broadcast. If a switch wants to send an IP datagram to a host on the same network, it first checks for a mapping in the cache. If no mapping is found, it needs to invoke the Address Resolution Protocol over the network segment. It does this by broadcasting an ARP query onto the network segment. This query contains the IP address in question (the "target IP address"). Each device receives the query and checks to see if it matches its IP address. If it does not match, the device sends a response message that contains its MAC address back to the originator of the query. The originator adds the information contained in this response to its ARP table.

The query message also includes the IP address and MAC address of the sending switch. Thus, when a device broadcasts a query message, each device on the network segment can learn the sender's link-level and IP addresses and place that information in its ARP table. However, not every device adds this information to its ARP table. If the device already has an entry for that device in is table, it "refreshes" this entry. That is, it resets the length of time until it discards the entry. If that device is the target of the query, then it adds the information about the sender to its table, even it did not already have an entry for that device. This is because there is a good chance that the source device is about to send it an application level-message, and it may eventually have to send a response or ACK back to the source; it will need the source's physical address to do this. If a device is not the target and does not already have an entry for the source in its ARP table, then it does not add an entry for the source. This is because there is no reason to believe that this device will ever need the source's link-level address; there is no need to clutter its ARP table with this information.

Thus, as the above discussion illustrates, ARP is designed to allow machines in the same physical segment to determine a correlation between IP addresses and physical MAC addresses. The present invention uses a network having several different network segments, such as the network illustrated in FIG. 3. Furthermore, the present invention supports the communication of devices on one network segment with devices on other network segments using a low level communication protocol. Because of this, what is needed is some way to extract out packets designed for devices on other interfaces, and route those packets accordingly.

Ethernet interfaces generally only pass to the software packets that match one of three criteria. The first is a straight comparison against the destination MAC address and the MAC address of the interface. If the two match, then the packet is accepted. Such a scenario has been described above. The second criteria matches against what is called a 'broadcast' packet. A broadcast packet is one that is addressed to the MAC broadcast address, which is FF-FF-FF-FF-FF-FF. The MAC broadcast address is used by ARP requests, some DHCP packets, and any other packet that is be distributed to all devices in a network. The third criteria matches against what is called a 'multicast' address. Multicast MAC addresses are implemented as a special mode of an Ethernet device. An Ethernet device may be set so that it receives packets that are destined to specific Multicast addresses while dropping packets that are destined to all remaining Multicast addresses. For example, a mask may be associated with an Ethernet card in which a particular bit in the mask is set. Then, any packet addressed to a multicast MAC address that corresponds to the single bit that has been set in the mask will not be dropped by the Ethernet card.

The present invention provides a method of using ARP maps that use the multicasting feature within ARP to its advantage. As discussed above, an ARP map is stored on each device of each network segment. The advantages of the present invention will be described using the simple case of the network of FIG. 3, which includes two network segments, 302 and 304. It will be appreciated that the techniques and algorithms described for this example can be extended to networks that have a much larger number of network segments. Furthermore, the advantages of the present invention will be described using the processing steps of FIG. 4.

In processing step 402, PC1 sends out an ARP broadcast request packet, denoted MAC (PC 1), requesting the MAC address of PC2. To illustrate processing step 402, consider the case where PC 1 has the IP address 10.10.1.6 and is on network segment 302 (FIG. 3). PC1 sends out an ARP request for PC2, which has the IP address 10.10.1.7. To do this, PC1 formulates a packet coming from it's MAC address (denoted MAC (PC1)) and destined to the broadcast address FF-FF-FF-FF-FF-FF. The packet has the following structure:

| | |
|---|---|
| Source: | MAC(PC1) |
| Destination: | FF-FF-FF-FF-FF-FF |
| IP Source: | 10.10.1.6 |
| IP Requested: | 10.10.1.7 |

All devices on network segment 302 see the packet as it is. However, PC2 is on a different network segment so MAC(PC1) does not reach PC2.

In processing step 404, switch 310 takes the ARP request packet and converts the packet by changing the source address "MAC (PC1)" to a special multicast MAC address. The special multicast MAC address can be used to internally uniquely identify that PC. This converted packet is denoted MCAST (MAC (PC1))). The structure of MCAST (MAC (PC1)) is as follows:

```
Source:         MCAST(MAC(PC1))
Destination:    FF-FF-FF-FF-FF-FF
IF Source:      10.10.1.6
IF Requested:   10.10.1.7
```

Using a multicast MAC address as the special identifier causes only packets directed at devices outside network segment 302 to pass to the protocol layer. If the MAC address was non-multicast, the packets would fail the criteria mentioned above and the upper layers would not be able to forward them.

In processing step 406, switch 310 records the fact that MCAST (MAC (PC1)) is the same device as MAC (PC1). Step 406 is performed so that switch 310 knows to forward to PC1 any reply packets that have the destination MAC address MCAST (MAC (PC1)). In processing step 408, switch 310 takes the modified packet and sends it to all other network segments. In particular, switch 310 forwards the modified packet to network segment 304. In processing step 410, devices on network segment 304 see a multicast packet having a source address of MCAST (MAC (PC1)), because of the special conversion performed by switch 310 during processing step 404. The net result of processing steps 404 through 410 is that it allows devices on other network segments (other interfaces) to reply to the multicast message initiated by PC1.

Figure 4A:
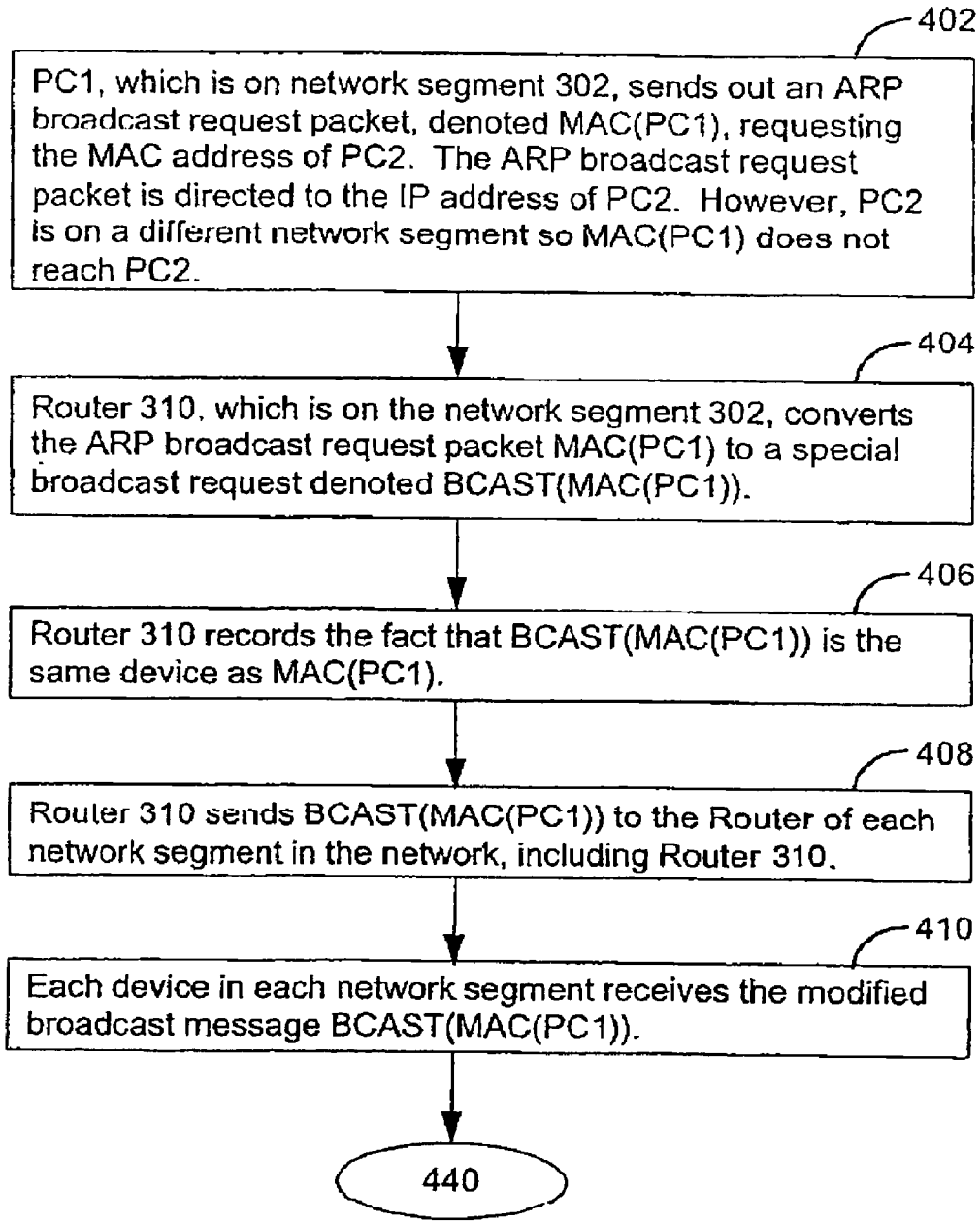
FIGS. 4A and 4B illustrate processing steps in accordance with one embodiment of the present invention.
Figure 4B:
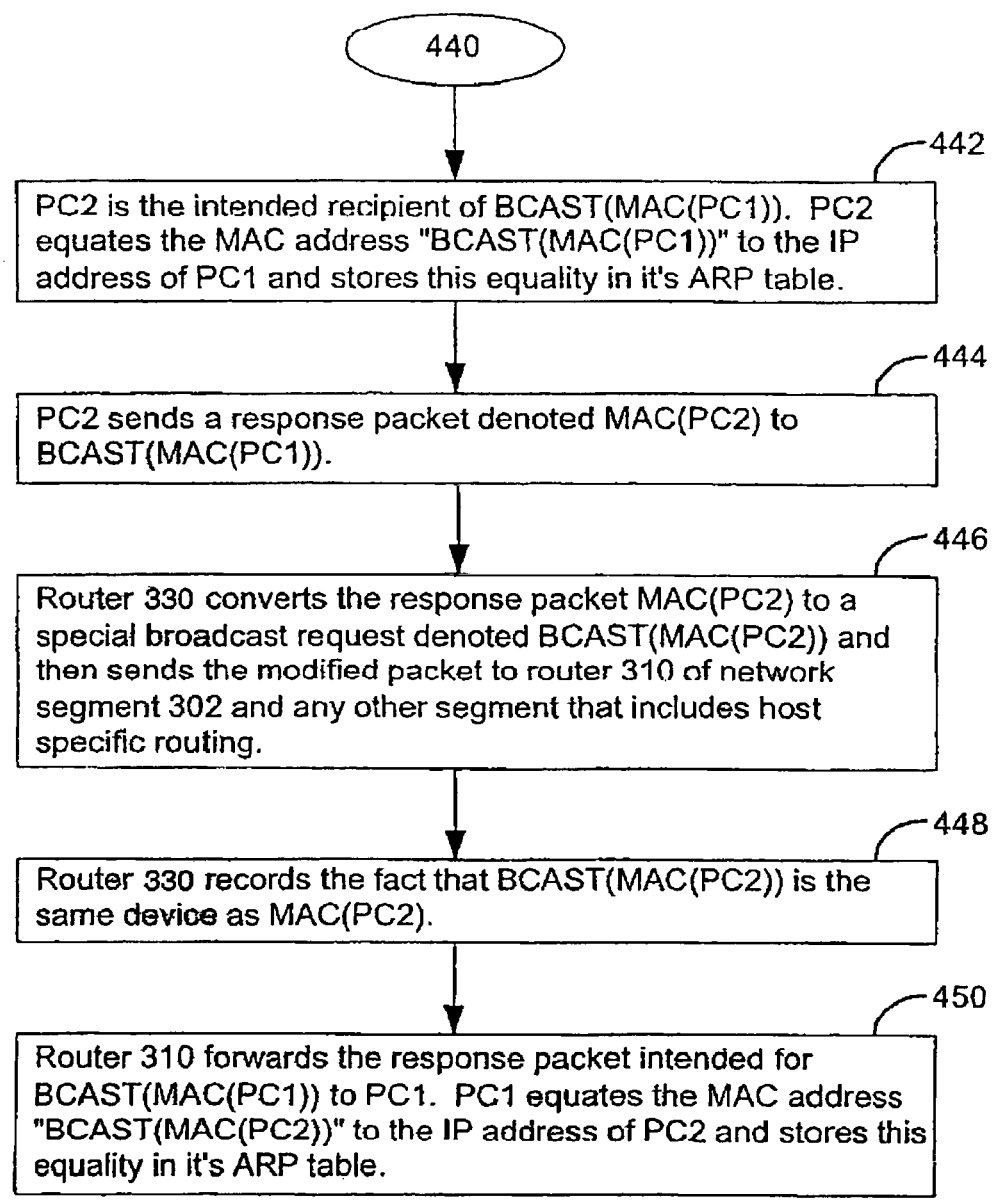

In FIG. 4B, the case where PC2 is a device 340 on network segment 304 is considered. In processing step 442, PC2 determines that it is the intended recipient of MCAST (MAC (PC1)). Therefore, PC2 equates the MAC address MCAST (MAC (PC1)) to the IP address of PC1 (10.10.1.6) and stores this equality in it's ARP table.

In processing step 444, PC2 sends a response packet (ARP reply) denoted MAC (PC2) to MCAST (MAC (PC1). The structure of this response packet is as follows:

```
Source:         MAC(PC2)
Destination:    MCAST(MAC(PC1))
I have:         10.10.1.7
To:             10.10.1.6
```

The ARP reply is accepted by switch 310. Since the target MAC address in the accepted ARP reply is MCAST (MAC (PC 1), the packet must go out the Ethernet segment and have the destination field of the packet populated with the value MAC (PC 1). Additionally, the source MAC address (MAC (PC2)), which is the whole point of this ARP exchange, must be substituted with a multicast MAC address that will allow the MAC switch detailed later to forward packets to the correct devices. The appropriate conversion is performed by switch 330. In processing step 446, switch 330 converts the ARP reply from PC2 to a special multicast request packet denoted MCAST (MAC (PC2)) and then sends the modified packet to switch 310 of network segment 302 and any other segment that includes host specific routing. The resulting packet that goes out the Ethernet interface of switch 310 into network segment 302 as a result of processing step 446 looks like the following:

```
Source:         MCAST(MAC(PC2))
Destination:    MAC(PC1)
I have:         10.10.1.7
To:             10.10.1.6
```

In processing step 448, switch 330 records the fact that MCAST (MAC (PC2)) is the same device as MAC (PC2). This step is performed so that if switch 330 ever receives packets destined for MCAST (MAC (PC2)), it will know to forward such packets to PC2. In processing step 450, switch 310 forwards the response packet intended for MCAST (MAC (PC1)) to PC1. Switch 310 knows that PC1 is the intended recipient of the packet intended for MCAST (MAC (PC)) because switch 310 recorded the fact that MCAST (MAC (PC1)) is in fact the same device as PC1 in processing step 406 (FIG. 4A). Then, PC1 equates the MAC address MCAST (MAC (PC2)) to the IP address of PC2 and stores this equality in it's ARP table.

The resulting ARP tables on the devices on each side of this exchange (devices 10.10.1.7 and 10.10.1.6) show the MCAST (MAC (PC-x)) address of the other PC:

| IP ADDRESS | MAC Address |
|---|---|
| ARP Table of PC1: | |
| 10.10.1.7 | MCAST(MAC(PC2)) |
| ARP Table of PC2: | |
| 10.10.1.6 | MCAST(MAC(PC1)) |

From this point forward, whenever PC1 needs to communicate with PC2, and vice-versa, they will use the special MCAST (MAC) addresses that are stored in their respective ARP tables. This allows for easy separation and forwarding of packets using a MAC switch that is resident on switches 310 and 330.

The techniques described above allows NAT and DHCP to function in a mixed-IP space, that is, with both routable and nonroutable addresses simultaneously. An added benefit of this is that it allows the network topology to be more flexible for the consumers network. Yet another advantage of the present invention is that it, in fact, decreases CPU utilization for LAN cross-segment traffic from what is experienced in prior art networks. In prior art networks, packets are required to completely traverse the IP stack twice (once up and once down) before they are routed out the correct interface. Use of the MAC bridge allows packets to be directed appropriately at the level of the Ethernet driver layer rather than at some higher layer in the ISO OSI model. Once the processing steps outlined in FIG. 4 have been completed for any two devices PC 1 and PC2 that are in a network, the two devices can communicate using the MAC bridge even though the two devices are in different network segments. The first device (PC 1) uses MCAST packets addresses to MCAST(MAC(PC2)) and the second device (PC2) uses MCAST packets addressed to MCAST(MAC (PC1)) to communicate with PC1. Because of this, PC1 and PC2 do not need to use layer 3 protocols to communicate with each other.

Implementation of the ARP MAP

It will be appreciated that the range of multicast MAC addresses that are available for assignment is limited to the conventions of the Internet Assigned Numbers Authority (IANA) (see http://www.iana.org/assignments/ethernet-numbers). In some embodiments of the present invention, each multicast MAC address contains within it an embedded index into an array of structures.

In one embodiment of the present invention, the array of structures contain the target MAC, the MCAST (MAC), and a function pointer to an output function that provides the correct interface to the network segment to which the target MAC is associated. As a device is detected, a static device is added to the route table within the device in the network segment. Furthermore, the MAC address is entered into the table. A MCAST (MAC) is then generated that indexes, as accurately as possible, the entry in the table. It is feasible to store this structure to flash memory on change or at regular intervals to maintain functionality across unexpected power failures.

MAC Switch

The MAC switch operates in conjunction with the ARP map. Using the data structure built up by the ARP map, the MAC switch accepts in packets directed to MCAST (MAC) addresses and sends out the correct interface packets directed to the correct MAC address. For example, if the MAC switch receives:

| | |
|---|---|
| Source MAC: | MAC(PC1) |
| Destination MAC: | MCAST(MAC(PC2)) |
| <PACKET DATA> | | it will look up the Destination MAC in the data structure, and send out a modified packet on that interface:

| | |
|---|---|
| Source MAC: | MCAST(MAC(PC1)) |
| Destination MAC: | MAC(PC2) |
| <PACKET DATA> | |

Because the MAC switch performs this conversion in both directions, devices such as printers and PC's will be able to maintain bi-directional data flow across two divergent network segments. The MAC switch is illustrated as processing steps 404, 406, 446, and 448 in FIG. 4.

Functionally, the present invention provides the user with an expanded range of customizability for his network. By implementing the virtual port components, the user is able to move his device, such as a printer or PC, to any desired interface without the need to call customer support in order to change the interface. Additionally, with the addition of NAT functionality, the user will be able to support multiple computers communicating seamlessly with each other accross the different physical segments.

ALTERNATIVE EMBOIDMENTS

Reference has been made to switches, such as switches 310 and 330. In telecommunications, a switch is a layer 2 network device that selects a path or circuit for sending a unit of data to its next destination. It will be appreciated, however, that a switch may also include the function of a router, which is a layer 3 device or program that can determine the route and specifically what adjacent network point the data should be sent to. Therefore, in alternate embodiments, the routers could be used rather than switches in the present invention.

While the foregoing description and drawings represent the preferred embodiments of the present invention, it will be understood that various additions, modifications and substitutions may be made therein without departing from the spirit and scope of the present invention as defined in the accompanying claims. In particular, it will be clear to those skilled in the art that the present invention may be embodied in other specific forms, structures, arrangements, proportions, and with other elements, materials, and components, without departing from the spirit or essential characteristics thereof. The presently disclosed embodiments are therefore to be considered in all respects as illustrative and not restrictive, the scope of the invention being indicated by the appended claims, and not limited to the foregoing description.

What is claimed is:

1. A method for communicating across divergent network segments in a network, the divergent network including a first network segment and a second network segment, the first network segment including a switch having a module, the module executing said method comprising the steps of:
    receiving an ARP request packet from a first device, said ARP request packet including a request to locate a second device and a first MAC address associated with said first device, a first IP address associated with said first device, and a second IP address associated with a second device, wherein said first device is coupled to said first network segment and said second device is coupled to said second network segment;
    broadcasting said ARP request packet to network segments outside of said first network segment;
    by converting said first MAC address to a first specialized multicast MAC address;
    modifying said ARP request packet to a multicast ARP request containing said first specialized multicast MAC address, and said first and second IP addresses;
    sending said multicast ARP request to all network segments outside of said first network segment;
    acquiring a reply from said second network segment; and
    transmitting said reply to said first device, such that in use, ARP tables are modified on said first device and said second device.

2. The method of claim 1, wherein said acquiring step further comprises accepting an ARP reply from said second network segment, the APP reply originating from said second device and the ARP reply including, as a source address, a second specialized multicast MAC address that represents said second device, the ARP reply further including said first specialized multicast MAC address as well as said first and second IP addresses.

3. The method of claim 2, wherein, before said second network segment sends said APP reply to said first network segment, said ARP reply is converted by a switch in said second network segment so that the ARP reply packet source indicator is changed from the MAC address of said second device to said second specialized multicast MAC address.

4. The method of claim 3, further comprising:
    adding a first ARP table entry to the ARP table of said first device, the first ARP table entry associating said second IP address with said second specialized multicast MAC address; and adding a second ARP table entry to the ARP table of said second device, the second ARP table entry associating said first IP address with said first specialized multicast MAC address.

5. The method of claim 4 further comprising:
utilizing a MAC switch and said first and second ARP table entries to forward data packets addressed to said first and second specialized multicast MAC addresses, wherein:
said MAC switch converts packets addressed to said first specialized MAC address so that they are addresses to the MAC address of said first device, and
said MAC switch converts packets addressed to said second specialized MAC address so that they are destined to the MAC address of said second device.

6. The method of claim 1, further comprising utilizing a single IP subnet for both said first network segment and said second network segment.

7. A network that supports communication across divergent physical interfaces, said network including a first network segment and a second network segment,
said first network segment including a switch and one or more devices, said switch including a module for routing packets; said module including:
instructions for receiving a broadcast request MAC (PC1) from a first device that is directed to a second device, wherein said first device is coupled to said first network segment and said second device is coupled to a said second network segment;
instructions for converting said broadcast request MAC (PC1) to a modified multicast request MCAST(MAC (PC1));
instructions for storing the identity relationship between MAC(PC1) and MCAST(MAC(PC1));
instructions for broadcasting MCAST(MAC(PC1)) to all network segments outside of said first network segment;
instructions for acquiring a reply packet directed to MCAST(MAC(PC1)) that ultimately originated from said second device; and
instructions for forwarding said reply packet to PC1 based on the identity of MAC(PC1) and MCAST(C(PC1)) that was preserved by said instructions for storing.

8. A network that facilitates communication across divergent network segments, the network including a first network segment and a second network segment, the first network segment including a switch, the switch including a module, said module comprising:
instructions for receiving an ARP request packet from a first device to locate a second device, wherein said first device is coupled to said first network segment and said second device is coupled to said second network segment wherein said ARP request packet including a first MAC address associated with said first device, a first IP address associated with said first device, and a second IP address associated with a second device;
instructions for broadcasting said ARP request packet to network segments outside of said first network segment including instructions for converting said first MAC address to a first specialized multicast MAC address;
instructions for modifying said ARP request to a multicast ARP request containing said first specialized multicast MAC address, and said first and second IP addresses; and instructions for sending said multicast ARP request to all network segments outside of said first network segment;
instructions for acquiring a reply from said second network segment; and
instructions for transmitting said reply to said first device, such that in use, ARP tables are modified on said first device and said second device.

9. The network of claim 8 wherein said instructions for acquiring further comprise instructions for accepting an ARP reply from said second network segment, the ARP reply originating from said second device and the ARP reply including, as a source address, a second specialized multicast MAC address that represents said second device, the APP reply further including said first specialized multicast MAC address as well as said first and second IP addresses.

10. The network of claim 9, wherein, before said second network segment sends said ARP reply to said first network segment, said ARP reply is converted by a switch in said second network segment so that the ARP reply packet source indicator is changed from the MAC address of said second device to said second specialized multicast MAC address.

11. The network of claim 10, wherein:
said first device includes a module that comprises instructions for adding a first ARP table entry to the ARP table of said first device, the first ARP table entry associating said second IP address with said second specialized multicast MAC address; and
said second device includes a module that comprises instructions for adding a second ARP table entry to the ARP table of said second device, the second ARP table entry associating said first IP address with said first specialized multicast MAC address.

12. The network of claim 11, wherein a MAC switch and said first and second ARP table entries are utilized to forward data packets addressed to said first and second specialized multicast MAC addresses, wherein:
said MAC switch converts packets addressed to said first specialized MAC address so that they are addresses to the MAC address of said first device, and
said MAC switch converts packets addressed to said second specialized MAC address so that they are destined to the MAC address of said second device.

13. The network of claim 8, further comprising utilizing a single IP subnet for said first network segment and said second network segment.

14. The network of claim 13, wherein said network has a limited number of routeable IP addresses and the association of said first IP address with said first device and the association of said second IP address with said second device conserves a pool of allocatable routeable IP addresses.

15. The network of claim 13, wherein said utilization of a single IP subnet for said first network segment and said second network segment conserves the number of IP addresses used across a plurality of network segments in said network.

* * * * *